3,637,562
BIURET-UREA-FORMALDEHYDE RESINS
George O. Orth, Jr., Seattle, Wash., assignor to
Nipak, Inc., Dallas, Tex.
Filed June 30, 1969, Ser. No. 837,390
Int. Cl. C08g 9/10, 9/12
U.S. Cl. 260—29.4 R    20 Claims

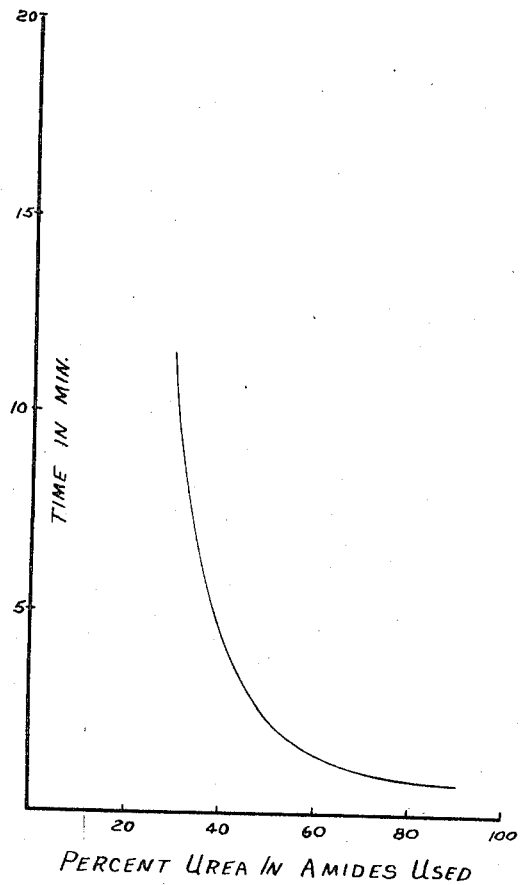
Fig. I — ACID COOK
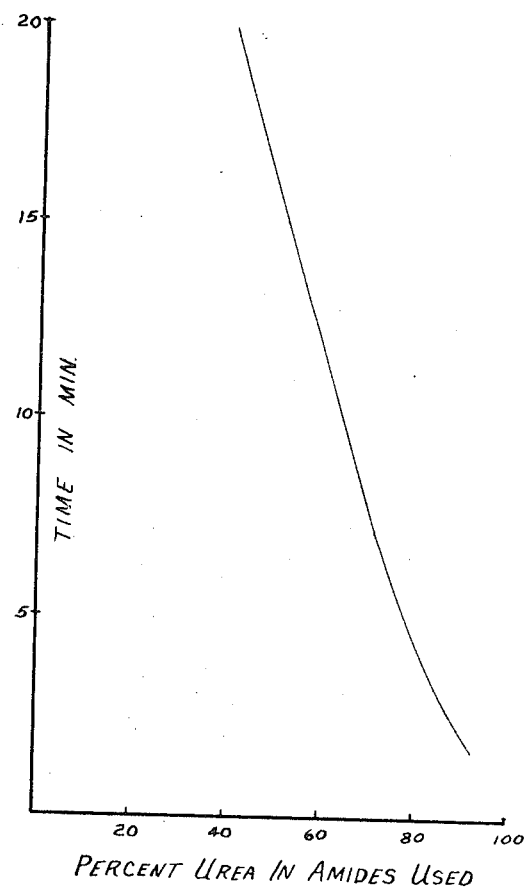
Fig. II — ALKALINE COOK
GEORGE OTTO ORTH, JR.
INVENTOR.
BY Howard E. Moore
ATTORNEY

United States Patent Office 3,637,562
Patented Jan. 25, 1972

ABSTRACT OF THE DISCLOSURE

A method of forming a biuret-urea-formaldehyde polymer and the product thereof, including, mixing formaldehyde with the biuret, in the ratio of 0.8 to 1.1 moles of formaldehyde per mole of primary amide group in the biuret and the hereaftermentioned urea, in the presence of an acid, such as hydrochloric acid, formic acid, etc., in an amount sufficient to attain a pH between about 3.7 and 4.8, and maintaining a temperature between about 70 and 100° C. for a predetermined period of time and thereafter adding the urea in an amount such that the ratio of biuret to urea is between about 0.4 and 9, adjusting the pH with an acid or a base to a value of about 3.7 to 5.6 and cooking the solution for a predetermined period of time. The exothermic reaction can be moderated by the addition of a buffer, such as disodiumcyanurate, sodium acetate, sodium borate, sodium phosphate, sodium citrate, etc., in amounts of about 1 to 12% based upon the volume of urea and biuret. The resultant polymer may be cured by the addition thereto of an appropriate catalyst, such as ammonium chloride, ammonium sulfate, ammonium phosphate, etc., in amounts of about 1 to 1.5% by weight, based on resin solids.

BACKGROUND OF THE INVENTION

The present invention relates to the preparation of a novel series of polymeric resins and the products thereof. A more specific aspect of the present invention relates to the preparation of a novel series of tripolymeric resins from biuret, urea and formaldehyde and the products thereof.

It is known in the prior art to make urea-formaldehyde resins by condensation under acid conditions. For example, in Goldschmidt and Neuss Pat. 1,844,570, a resin is produced by this method and it is described as being porous and opaque. Pat. 1,791,062 to Luther also describes the production of urea-formaldehyde resins using acidic initiators. Pat. 2,244,289 to Cordier describes the preparation of alkylated biuret-formaldehyde resins in an acid medium. None of these patents, however, suggests the formation of polymers of urea, biuret and formaldehyde. However, polymers of urea, biuret and formaldehyde are described in Craig and Minor Pat. 3,005,792. In accordance with this patent, polymers of urea, biuret and formaldehyde are formed by condensation of the reactants under alkaline conditions. The resultant resins have been found to be extremely slow in curing.

It is therefore an object of the present invention to overcome the difficulties and disadvantages set forth above. It is a further object of the present invention to provide an improved method for the preparation of polymeric resins and the products thereof. Yet another object of the present invention is to provide an improved method for the preparation of a biuret-urea-formaldehyde resin and the product thereof. Another and further object of the present invention is to provide an improved method for forming tripolymeric resins of biuret, urea and formaldehyde and the products thereof. A still further object of this invention is to produce biuret-urea-formaldehyde resins which form sparkling clear solutions of high dilutability and which can be used in the aqueous solution to provide bright, clear surface coatings. Another and further object of the present invention is to provide a method for the preparation of tripolymers of biuret, urea and formaldehyde which are extremely rapid in curing. A further object of the present invention is to provide an improved method for the preparation of tripolymeric resins of biuret, urea and formaldehyde which harden at ambient temperatures without blush.

BRIEF SUMMARY OF THE INVENTION

In accordance with the present invention, a novel series of polymeric resins is produced by condensing biuret, urea and formaldehyde in an acid medium. True tripolymers of biuret, urea and formaldehyde are obtained by first mixing the biuret and formaldehyde under acid conditions, reacting the same for a period of time, and thereafter adding urea to the reaction mixture. The exothermic character of the reaction may be controlled by the addition of a buffer.

BRIEF DESCRIPTION OF THE DRAWINGS

In accordance with the drawings:
FIG. 1 is a plot of the curing time of a biuret-urea-formaldehyde resin produced under acid conditions; and
FIG. II is a plot of the curing time of a biuret-urea-formaldehyde resin produced under alkaline conditions.

DETAILED DESCRIPTION OF THE INVENTION

In the preparation of the resins of the present invention, the amounts of biuret, urea and formaldehyde may be varied over a relatively wide range depending upon the nature of the product desired. However, it has been discovered that mixtures containing from 30 to 70% by weight of biuret, based on the total weight of reactant mixture reactants, produce resins of systematically varying cure rates and characteristics. Similarly, best results are obtained by utilizing a urea to biuret ratio by weight of about 0.4 to 9.0 to 1.0. The volume of formaldehyde should not exceed 1.1 moles formaldehyde per mole of available primary amide group

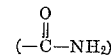

in the biuret and urea constituents. Preferably, however, formaldehyde should be present in the amount of about 0.8 and 1 mole formaldehyde per mole of available primary amide group. It should be recognized at this point that each molecule of urea and biuret has two such primary amide groups.

In order to attain and maintain an acidic environment for the condensation reaction, one may utilize any appropriate organic or inorganic acid as an addition agent and catalyst, for example, formic, hydrochloric, sulphuric, nitric, phosphoric, acetic, chloroacetic, propionic, phenolsulfonic acids and others capable of giving a low enough pH to cure the resin, or low enough to effect a pH of from 3.7 to 4.8 to cook the resin. The amount of acid utilized should be such that the pH of the starting mixture is between about 3.7 and 4.8. It has been found that at pH's below the stated limit, the reaction becomes too vigorous and the resin precipitates. On the other hand, by using higher pH the resin which precipitates on standing and the resin produced, even after several hours of cooking, is not sufficiently reacted to be useful. Control of the acidity is necessary, and one must determine the amount of acid present in the formaldehyde prior to resin preparation. Buffers may be added to control excess acidity.

In the preparation of the resins of the present invention, it has also been found that a solution of biuret in formaldehyde should be formed at an acid pH prior to the addition of the urea. This sequence of operations is necessary to produce clear, stable resins. The resin formed by this particular sequence is a homogeneous tripolymer or a di-tri-polymer. When catalyzed in the water solution, this polymer will dry to a clear film without blush. By way of contrast, if the reactants are added simultaneously, it is believed that a mixture of polymers is formed. Because of the limited water solubility and lower reactivity of the biuret, it appears that the urea forms a dipolymer with the formaldehyde before the biuret has a chance to react; thus, the product appears to be a mixture of urea-formaldehyde and biuret-formaldehyde dipolymers.

When using the desired addition sequence, it is believed that it is possible to produce many types of molecular configurations in the polymer product. The exact configuration is undoubtedly governed by the length of time the biuret is in contact with the formaldehyde in the initial stage of the treatment and before urea is added. Thus, it is possible to have products as follows: FBFU—F; FBF—B—FUF; FBFU—F—U—B—F; etc., F representing formaldehyde constituents, B representing biuret constituents, and U representing urea constituents.

For best results, the resins are prepared while maintaining the temperature between about 70 and 100° C. Since the reaction is exothermic, the temperature must be controlled deliberately. We have found that the heat may be removed by provision for rapid heat exchange. It has also been found in accordance with the present invention that good results are obtained by moderating the reaction rate by the addition of a buffer to accommodate the rate of reaction to the heat removal capacity available. A number of buffers can be used in the system. For example, disodium cyanurate is an effective buffer and will also enter into the reaction as a co-condensate. It is known that cyanuric acid is reactive with formaldehyde in an acid medium and will form a resin therewith. See German Pat. Nos. 924,241 and No. 1,079,585, and British Pat. No. 870,504. Other buffers which can be used include sodium acetate, sodium borates, sodium phosphate, sodium citrates and other known buffers. Salts of triethanolamine and the alkanol amines can also be successfully used as buffers in the acid system. If the latter are used in amounts in the order of about 10% based on the weight of biuret and urea, cationic resins are produced which can be utilized for fiber precipitates. Triethanolamine hydrochloride is generally used to produce such cationic resins. In general, about 1 to 12% of buffer can be utilized. Normally when using 1% disodium cyanurate as a buffer, 1% of formic acid is used as the acid. As the amount of buffer is increased, the amount of acid must likewise be increased to reach the same pH.

As soon as the exotherm subsides, the pH of the mixture is generally adjusted to a value between about 4.0 and 5.6, either by the addition of acid, such as formic acid, or an alkali, such as caustic. Cooking of the resin then proceeds at essentially the same temperature. The properties of the resins may be adjusted to a certain extent by adjusting the cooking time in conjunction with control of the pH. For example, to increase the viscosity of the resin, a longer cooking time is utilized at a relatively low pH, for example 4.0 to 5.0. Inversely, to increase the water dilutability, a shorter cooking time is utilized at a higher pH, for example 4.6 to 5.6. The water dilutability can be further enhanced by increasing the amount of buffer. Additionally, all of the resins of the present invention are more soluble in hot water than cold, and some can be precipitated from a hot dilute solution by lowering the temperature.

After sufficient cooking, the mixture is vacuum distilled and the pH again adjusted to a neutral pH by the addition of caustic. The adjustment of the pH in this final stage can also be performed prior to the vacuum distillation. If the resin is to be used for spraying on particle board or fiber, it is unnecessary to vacuum distill.

The resin cures rapidly in the presence of the usual catalysts for urea-formaldehyde type resins. For example, 1 to 1.5% of ammonium chloride based on the weight of the resin solids may be utilized. The catalyst may be admixed with the resin as a solid or incorporated in wood flour or it may be added as a liquid buffered with ammonia. Other appropriate catalysts include ammonium chloride, ammonium sulfate, ammonium phosphate, mineral acids, or any acid capable of giving a sufficiently low pH to cure the resin.

Referring to the drawings, a comparison of FIGS. I and II will show the relative curing times of the resins of the present invention, as compared with biuret-urea-formaldehyde resins condensed in an alkaline medium. As is apparent from FIG. I, a resin prepared in an acid medium, in accordance with the present invention, increases slowly in curing time from less than 1 minute to about 2½ minutes as the content of biuret in the mixture increases from 10 to 50%. As the biuret concentration is increased above 50%, the cure cycle lengthens more rapidly, reaching about 11½ minutes at 70% biuret. On the other hand, a resin prepared at an alkaline pH shows an entirely different and substantially longer cure cycle. It can be seen from FIG. II that the curing curve has a greater initial slope and is more nearly linear. Substantially longer curing cycles can be observed when 30 to 70% biuret is utilized. When contrasting these resins with the resins of the present invention, it is to be seen that at 50% biuret, a curing cycle of about 2.5 minutes obtains for the acid resin while the alkaline resin, at the same biuret concentration, requires a curing time of 15.5 minutes.

The resins produced in accordance with the present invention may be utilized in a wide variety of fashions. These uses include use as an adhesive bonding agent for plywood, hardboard, particle board, flake board and the like, and as a clear surface coating for various materials, as a wet strength resin for papers, liner boards, cloth and other cellulosic fibers. These surface coatings are bright and clear and harden at ambient temperature without blush. These products have a distinct advantage that they are fire retardant by virtue of being intumescent.

Example 1

By way of specific example, a series of resins were prepared as follows:

Methanol, water and formaldehyde were mixed. (The formaldehyde should be titrated with 1/10 normal sodium hydroxide, using brom thymol blue indicator, prior to its use, and the acid content determined.) To this is added the appropriate amount of biuret and the buffer. Formic acid is added to bring the acidity of the mixture to the equivalent of 1 gram of acid calculated as formic acid, or to a pre-selected pH. The mixture is then rapidly brought to a temperature of about 70 to 75° C. to effect solution of the biuret which requires about 10 minutes. The urea is added as soon as this solution is complete. The temperature is then allowed to rise to about 90 to 95° C. and it is held at this temperature first with cooling and thereafter with heating after the exothermic reaction subsides. As soon as the exotherm subsides, the pH is adjusted to about 4.5 with either formic acid or caustic. The cooking is allowed to proceed at 95° C. for about 1 hour. At the end of 1 hour, vacuum distillation is applied and the final mix is adjusted to about 66% solids by weight. The pH is also adjusted to about 6 to improve its stability.

Table 1 below lists four resins made in this manner in which the pH was maintained between 4.0 and 4.8 and either sodium cyanurate, sodium acetate, or triethanol amine was utilized as a buffer.

TABLE 1

|  | Parts by weight | | | |
| --- | --- | --- | --- | --- |
| MeOH | 34 | 34 | 34 | 34 |
| H₂O | 70 | 70 | 70 | 70 |
| CH₂O, 50% solution | 280 | 280 | 280 | 280 |
| Biuret | 103 | 140 | 60 | 103 |
| Sodium cyanurate | 1 | 1 | 0 | 0 |
| Formic acid | 1 | 1 | 1 | 1 |
| Urea | 103 | 60 | 140 | 103 |
| Sodium acetate | 0 | 0 | 1 | 0 |
| Triethanolamine | 0 | 0 | 0 | 3 |

TABLE I.—MOISTURE RESISTANCE OF BIURET ADHESIVE

| | Percent wood failure | |
| --- | --- | --- |
| Number of cycles | Biuret resin | Control |
| 1 | 100 | 100 |
| 2 | 100 | 100 |
| 3 | 100 | 100 |
| 4 | 100 | 95 |
| 5 | 100 | 95 |
| 6 | 100 | 40 |

Example 2

Utilizing the same procedure as set forth in Example 1, the following cationic resin was prepared.

Thirty-four grams of methanol, 70 grams of water, 320 grams of 50% formaldehyde and 22 grams of triethanol amine were mixed and sufficient 25% hydrochloric acid was added to bring the solution to a pH of 4.8. One hundred and three grams of biuret was then added. The temperature was brought to 75° C. and 103 grams of urea were added followed by cooking at 95° C. for about one hour.

Example 3

A mixture was made of 34.0 grams of methanol, 135.0 grams water, 280.0 grams 50% formaldehyde (pH 4.3) and 103.0 grams biuret. This mixture was heated to 70–75° C. where the biuret dissolved. Thereupon there was added 103.0 grams of urea, and, by providing good cooling, the temperature at about 95–97° C. was maintained for a half-hour. This technique produced a clear resin solution which did not precipitate on standing.

Example 4

The procedure in Example 3 was repeated, but the exothermic heat of reaction was controlled by inclusion of 1.0 gram disodium cyanurate and sufficient formic acid to bring the pH to 4.3.

Each of the resins of Examples 3 and 4 were cured at 100° C. with 0.1% NH₄Cl, and each cured in 2.5 minutes.

Example 5

A mixture was made consisting of 103.0 grams biuret, 34.0 grams methanol, 135.0 grams water, 280.0 grams of 50% formaldehyde, and 1.0 gram of disodium cyanurate. Then 1.0 gram of formic acid was used to bring the pH to 3.9. The mixture was heated to 70–75°, dissolving all of the solids. To this solution there was added 103 grams of urea and allowed the temperature of the mixture to rise to 95–97° C. The mixture was maintained at 95° C. for a half-hour and then vacuum evaporated until it was 66% solids content.

The resin of Example 5 was used neat on Douglas fir veneer at a spread rate of 60 pounds per thousand square feet of double glue-line. Plywood was pressed from this veneer with 1.0 minute assembly time, 2.5 minutes pressing time at 175 p.s.i.g. and 250° F. Similar panels were made from the resin of Example 5 and from a good commercial urea formaldehyde adhesive resin.

These plywood panels were held for twenty-four hours prior to breaking. Wet wood failure samples were subjected to up to six cycles of (a) soak under 28–29 inches of vacuum for one hour;
(b) soak for one hour at 60–80 p.s.i.g.

The water used was at 70° F. for these experiments. Wood failure was estimated over five square inches for each panel. Duplicate samples were run. Table I shows the superiority of the biuret resin compared to the control.

A particle board using a resin like that in Example 5 with a pine furnish was made. The controls were made with a commercial adhesive. The particle board was made with a density of 40 pounds per cubic foot, and the moisture resistance was measured. In every case the biuret resins provided better moisture resistance than the control. Using 8% of resin, the control absorbed 30% more water in one hour, 16% more in two hours. The modulus of rupture and the modulus of elasticity were measured and found to be better in each biuret sample than in the corresponding control.

Having described my invention I claim:

1. A method for the preparation of a polymer comprising: reacting biuret and formaldehyde at a pH of about 3.7 to 4.8 and a temperature of about 70 to 100° C. until solution is complete, thereafter adding urea and allowing the reaction to continue at a temperature within said temperature range, the ratio of said biuret to said urea being between about 0.4 to 1 and 9 to 1 and the said formaldehyde being present in an amount of about 0.8 to 1.1 mols of formaldehyde per mol of primary amide group in said biuret and said urea.

2. A method in accordance with claim 1 wherein the exothermic heat of reaction is controlled by the addition of a buffer.

3. A method in accordance with claim 2 wherein the buffer is a sodium salt of cyanuric acid.

4. A method in accordance with claim 3 wherein the buffer is disodium cyanurate.

5. A method in accordance with claim 1 wherein the acidic pH is maintained by the addition of formic acid.

6. A method in accordance with claim 1 wherein the biuret is present in an amount of 30 to 70% by weight of the total weight of reactants.

7. A method in accordance with claim 1 wherein the pH is adjusted to a value between about 3.7 and 5.6 as soon as the exothermic reaction subsides.

8. A method in accordance with claim 7 wherein the pH is adjusted to between 3.7 to 5.0.

9. A method in accordance with claim 7 wherein the pH is adjusted to the value between 4.6 and 5.6.

10. A method in accordance with claim 1 wherein the temperature is raised to a higher temperature within the range of 70 to 100° C. after the addition of the urea.

11. A polymer product formed by reacting biuret and formaldehyde at a pH of about 3.7 to 4.8 and at a temperature of about 70 to 100° C. until solution is complete, and thereafter adding the urea and allowing the reaction to continue at said temperature, said biuret and urea being in a range of about 0.4 to 9 mols of biuret per mol of urea and said formaldehyde being present in amount of about 0.8 to 1.1 mols of formaldehyde per mol of primary amide group in said biuret and said urea.

12. A product in accordance with claim 11 wherein the exothermic heat of reaction is controlled by the addition of a buffer.

13. A polymer in accordance with claim 11 wherein the buffer is a sodium salt of cyanuric acid.

14. A polymer in accordance with claim 13 wherein the buffer is disodium cyanurate.

15. A polymer in accordance with claim 11 wherein the acidic medium contains formic acid.

16. A polymer in accordance with claim 11 wherein the biuret is present in an amount of 30 to 70% by weight of the total weight of reactants.

17. A polymer in accordance with claim 11 wherein the pH is adjusted to a higher value between about 4.0 and 5.6 as soon as the exothermic reaction subsides.

18. A polymer in accordance with claim 17 wherein the pH is adjusted to between 3.7 and 5.0.

19. A polymer in accordance with claim 17 wherein the pH is adjusted to the value between 4.6 and 5.6.

20. A product in accordance with claim 11 wherein the temperature is raised to a higher temperature within the range of 70 to 100° C. after the addition of urea.

References Cited

UNITED STATES PATENTS

| | | | |
|---|---|---|---|
| 2,768,055 | 10/1956 | Streck et al. | 8–74 |
| 2,769,796 | 11/1956 | Suen et al. | 260—70 X |
| 2,797,225 | 6/1957 | Anderson | 260—306.8 |
| 2,901,391 | 8/1959 | Wilson et al. | 162—167 |
| 2,947,750 | 8/1960 | Gerg | 260—249.6 |
| 3,005,792 | 10/1961 | Craig et al. | 260—29.4 |

HOWARD E. SCHAIN, Primary Examiner

U.S. Cl. X.R.

117—148, 155 L, 161 LN; 161—261; 260—17.3 R, 70 R